March 7, 1933.  J. I. PNEUMAN  1,900,733
ANIMAL TRAP
Filed May 29, 1931
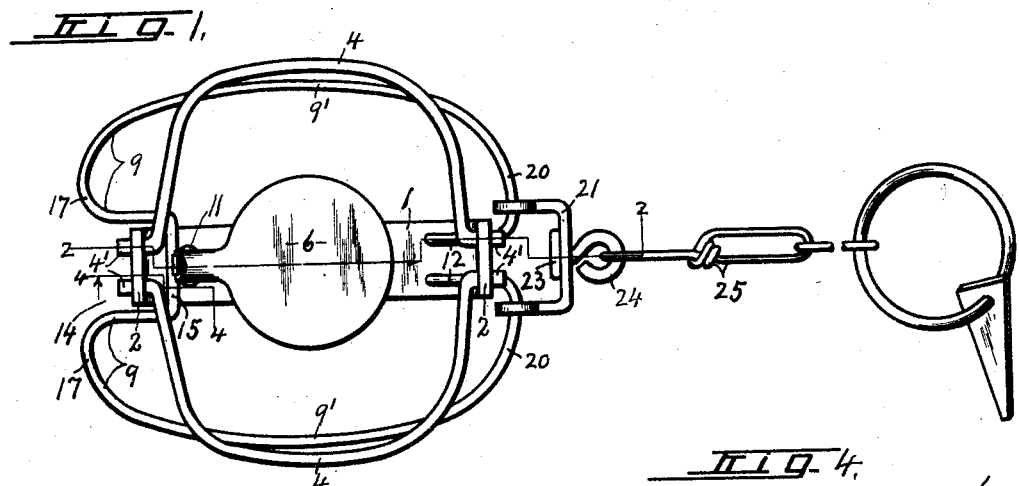
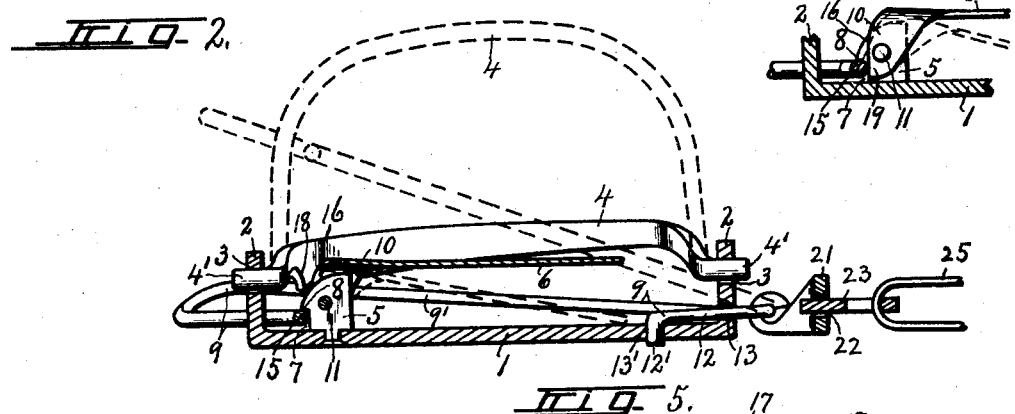
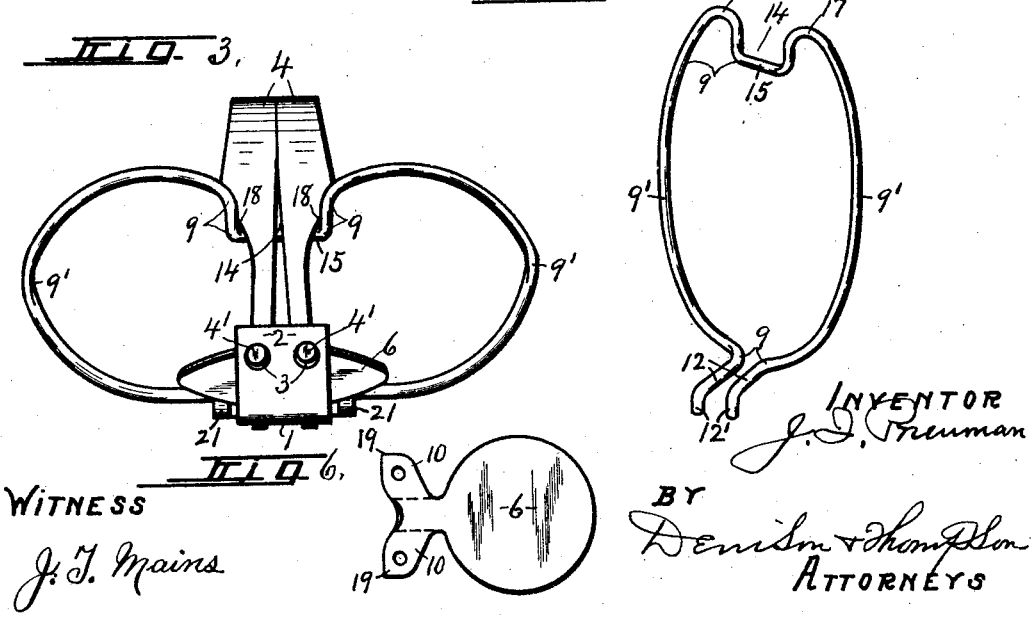
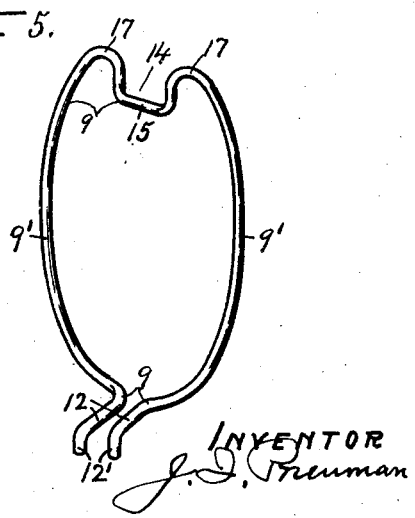
WITNESS
J. J. Mains
INVENTOR
J. I. Pneuman
BY
Denison & Thompson
ATTORNEYS Patented Mar. 7, 1933

1,900,733

UNITED STATES PATENT OFFICE

JAMES IRWIN PNEUMAN, OF CAMILLUS, NEW YORK

ANIMAL TRAP

Application filed May 29, 1931. Serial No. 540,936.

This invention relates to an animal trap in which a pair of opposed jaws are pivoted at their ends to upstanding flanges on the opposite ends of a supporting bar or frame and are adapted to be closed by a spring under the control of the bait pan.

The main object is to simplify the construction by reducing the number of parts and at the same time to increase the general efficiency of the trap both in the setting of the jaws and in the manner of releasing the same from their set positions.

One of the specific objects is to provide a single jaw-operating spring which may also serve for out-bearings for the trap upon the ground or other support when the jaws are set.

Another object is to utilize the same spring in cooperation with the pan-supporting post for automatically locking the spring in its tensioned position and thereby allowing the jaws to be freely opened or adjusted to any particular angle to each other free from the tension of the spring.

Another object is to provide the heel of the pan with cam means for releasing the spring from engagement with the post by relatively light downward pressure upon the pan and thereby to effect a quick and powerful closing of the jaws by the spring.

Another object is to enable the ends of the spring to be easily and quickly attached to the frame before the jaws are assembled thereon and without the use of special tools.

Another object is to utilize portions of the spring as pivotal connections for a suitable yoke or clevis to which the anchor chain may be swivelled, thereby constituting a double swivel connection between the anchor chain and trap.

Other objects and uses relating to specific parts of the trap will be brought out in the following description.

In the drawing:—

Figure 1 is a top plan of an animal trap embodying the various features of my invention in which the moving parts are shown in their set positions ready for operation.

Figure 2 is a longitudinal sectional view of the same trap taken in the plane of line 2—2, Figure 1, in which the dotted lines indicate the closed position of the jaws and the position of the spring for closing said jaws.

Figure 3 is an end view of the same trap with the jaws closed and the spring in position for closing the same.

Figure 4 is a detail sectional view taken in the plane of line 4—4, Figure 1, showing more particularly the manner of holding the spring against its own tension for permitting the jaws to be opened and also showing the cam on the heel of the pan for effecting the release of the spring from engagement with the pan-supporting post when the pan is depressed.

Figure 5 is a perspective view of the detached spring.

Figure 6 is a top plan view of the bait pan showing the ears on the heel of the pan as unfolded before bending.

As illustrated, this trap comprises a single relatively narrow substantially rectangular frame bar 1 of suitable metal elongated in one direction and having its opposite ends bent upwardly to form similar flanges 2 having opposite pairs of aligned apertures 3 for the reception of pintles 4' on the ends of a pair of jaws 4, the major portions of each jaw between the pintles being offset in more or less arcuate form to one side of its axis of rotation, as shown more clearly in Figure 1.

The frame bar 1 is provided near one end with a substantially central upstanding post 5 which is preferably formed separately from the bar and firmly riveted or otherwise secured thereto for receiving and supporting a bait pan 6, the rear edge of the post 5 being recessed at 7 to form a shoulder 8 in spaced relation to the upper face of the bar 1 for receiving and engaging the adjacent portion of a wire spring 9, presently described.

The heel of the bait pan is provided with a pair of opposed apertured ears 10 bent downwardly from the plane of the pan and arranged in spaced relation corresponding approximately to the transverse width of the post 5 for engaging opposite faces thereof, the post 5 and ears 10 being provided with aligned apertures for receiving a pivotal pin 11 by which the bait pin is pivotally connected to the post for free vertical movement, the ends of the pivotal pin 11 being upset or enlarged to hold it against endwise displacement.

The spring 9 is preferably made of a single piece of wire in the form of an elliptical split ring of somewhat greater length than that of the jaws 4 and frame bar 1, so that the sides thereof may underlie the jaws at opposite sides of the frame bar when the trap is set, as shown in Figure 1.

The end portions 12 of the split wire ring 9 are returned inwardly a relatively short distance and then downwardly at 12′ and are inserted from the outside inwardly through apertures 13 in the adjacent upstanding flange 2 just below the corresponding pintles 4′ before the jaws 4 are assembled upon the frame bar 1 after which the downturned terminal ends 12′ are passed through apertures 13′ in the horizontal portion of the bar 1 a relatively short distance from the adjacent upturned flange 2, thereby locking the corresponding end of the split ring to the frame bar against lengthwise or lateral movement relatively to said bar.

The intermediate portion of the opposite end of the spring is bent inwardly at opposite sides of the adjacent upturned flange 2 to form a recess 14 and a cross bar 15 across the inner end of the recess so that the opposite walls of the recess will be arranged in more or less close proximity to corresponding side edges of the adjacent upstanding flange 2, while the cross bar 15 will extend across the upper face of the bar 1 between the post 5 and adjacent flange 2, as shown more clearly in Figures 1, 2 and 4.

The opposite arms as 9′ of the wire spring 9 are bowed outwardly and the connections between the cross bar 15 and adjacent ends of the arms 9′ are also arcuate or arched outwardly.

In like manner the connections between the inturned extensions 12 and adjacent ends of the arms 9′ are curved in opposite directions so that the crossbar 15 is free to spring endwise of the split ring which is tensioned to cause the central portion of the cross bar to enter the recess 7 in the post 5 and to engage the shoulder 8 to hold the spring ring under tension when setting the trap.

When the ends 12 and 12′ of the spring ring 9 are engaged in their respective apertures 13 and 13′, the remaining portions of the ring will be tensioned to normally spring upwardly somewhat beyond the position shown by dotted lines in Figure 2 so as to continue to exert pressure upon the lower or outer edges of the adjacent ends of the jaws when the latter are placed in operative position upon the frame bar 1.

That is, after the spring ring is assembled upon the frame in a manner described, the jaws 4 will be placed in operative position in the apertures of their respective flanges 2 with one end of the jaws extending through the recess 14 in the adjacent end of the spring ring, as shown more clearly in Figures 1 and 3, so that when the end of the spring ring 9 adjacent the cross bar 15 is depressed by hand against the tension of the ring, the intermediate portion of the cross bar 15 will ride against the upper cam face 16 of the post 5, thereby pressing said cross bar outwardly toward the adjacent flange 2 until it rides under and engages the shoulder 8 on the rear edge of the post 5, at which time the adjacent end of the spring ring will be locked against upward springing movement to allow the jaws 4 to be fully opened.

The connections between the cross bar 15 and opposite arms 9′ of the spring ring form loops 17 extending beyond the adjacent ends of the jaws 4 and also beyond the adjacent flange 2 to form handles or finger pieces by which the adjacent end of the spring ring may be depressed against its own tension until the cross bar is interlocked with the shoulder 8, as shown in Figure 2, it being understood that the arms 9′ will then extend lengthwise directly under the outer portions of the jaws when the latter are opened and that the inner arms of the loops 17 will also extend across the lower edges of the adjacent portions of the jaws.

The ends of the jaws 4 adjacent the cross bar 15 are provided on their outer edges with inclined cam faces 18 substantially midway between the pintles 4′ and outer faces of the jaws, the portions of the adjacent ends of the jaws below the cams 18 being of less combined width when the jaws are closed than the transverse length of the cross bar 15, or distance across the loop of which the cross bar 15 forms the inner wall.

The portions of the adjacent ends of the jaws above the cam faces 18 have a combined width when the jaws are closed somewhat greater than the length of the cross bar 15 and transverse width of the recess 14, so that when the adjacent end of the spring is released from engagement with the shoulder 8 on the post 5 in a manner presently described, the adjacent end of the spring will immediately spring upwardly, thereby causing the opposite wall of the recess 14 to engage the cam faces 18 for closing the jaws against each other, as shown more clearly in Figure 3.

The shoulder 8 on the post 5 is disposed in a plane below that of the pivotal pin 11 for the bait pan 6, so that when the opposite ears 10 are mounted upon the pivotal pin 11 at opposite sides of the post 5 their lower ends 19 will extend across and engage the inner edge of the cross bar 15 when the latter is engaged with the shoulder 8 to hold the bait pan in a substantially horizontal plane, as shown more clearly in Figures 1, 2 and 4.

The lower portions of the ears 10 on the heel of the pan 6 constitute what may be termed pawls adapted to be operated by an animal stepping or pressing down upon the bait pan for engaging the cross bar 15 and forcing the same against the tension of the spring 9 out of engagement with the shoulder 8, thus permitting the adjacent end of the spring to fly upwardly under its own tension with considerable force for closing the jaws upon the entrapped animal.

During this latter operation the bait pan 6 will drop downwardly by its own weight or by the weight of the animal thereon to assure the entrapping of the animal and at the same time to throw the pawls 19 rearwardly beyond the shoulder 8.

It therefore follows that when the rear end of the spring 9 is again depressed for re-engaging its cross bar 15 with the shoulder 8, it will simultaneously engage the pawls 9, thereby forcing the same downwardly and at the same time raising the pan 6 to its horizontal position, thus completing the setting operation of the trap.

In other words the simple act of depressing the rear end of the spring 9 will cause the cross bar 15 to automatically restore the pan 6 to its set position, while on the other hand when the pan is depressed by the animal it will automatically trip the cross bar 15 from the shoulder 8 to release the rear end of the spring and thereby allow it to close the jaws.

It is now evident that when setting the trap it is not necessary for the operator to touch either the bait pan or jaws, but simply to depress the rear end of the spring until interlocked with the post 5, thereby setting the pan 6 to its horizontal position and allowing both jaws 4 to be moved safely to their fully opened positions.

The return bends 20 of the front ends of the spring 9 form loops to which are pivotally attached the opposite arms of a U-shaped yoke 21 having a central aperture 22 in which is pivoted one end of a swivel bolt 23 having its other end provided with an eye 24 for attachment to a chain 25 or equivalent anchoring device, the latter being arranged to be fastened to a stake or any other anchorage in the ground near the place where the trap is to be set.

The operation of the invention has been described in such full and exact terms as will enable anyone skilled in the art to make and use the same, but evidently various changes may be made in the construction without departing from the spirit of the invention.

What I claim is:—

1. In an animal trap having a frame and a pair of jaws pivoted thereto, a post on the frame having a shoulder, a jaw-operating spring mounted on the frame and movable into holding engagement with said shoulder against its own tension, and a bait-pan pivoted to said post and provided with an extension adapted to be engaged by the spring when the latter is engaged with the shoulder for releasing said spring from the shoulder when the bait-pan is depressed.

2. An animal trap comprising a frame, jaws pivoted to the frame, a post on the frame having a shoulder, a spring ring elongated in the direction of length of the jaws and having one end attached to the frame and its other end movable by hand against its own tension into holding engagement with said shoulder, the opposite sides of the ring being adapted to engage the jaws for closing the latter when the spring is released, and a bait-pan pivoted to said post and provided with an extension adapted to be engaged by the spring when the latter is engaged with the shoulder for setting the pan and re-acting against the spring to release the same from the shoulder when the pan is depressed.

3. In an animal trap, a frame, cooperative primary jaws pivotally mounted on the frame to swing about parallel axes, a detent fixedly mounted on the frame, a jaw operating spring mounted on the frame and depressible against it tension into holding engagement with said detent, and a bait pan hingedly mounted on the frame and provided with an extension projecting into the path of movement of the detent-engaging portion of the spring to cause the bait pan to be automatically set to its operative position when the spring is engaged with the detent.

In witness whereof I have hereunto set my hand this 21st day of May 1931.

JAMES I. PNEUMAN.